US 7,228,558 B1

(12) United States Patent
Lebouill (10) Patent No.: US 7,228,558 B1
(45) Date of Patent: Jun. 5, 2007

(54) ADDRESS ASSIGNMENT IN DIGITAL TRANSMISSION SYSTEM (75) Inventor: Gilles Lebouill, Paris Cedex (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 09/889,992

(22) PCT Filed: Jan. 21, 2000

(86) PCT No.: PCT/IB00/00118

§ 371 (c)(1),
(2), (4) Date: Jan. 9, 2002

(87) PCT Pub. No.: WO00/44145

PCT Pub. Date: Jul. 27, 2000

(30) Foreign Application Priority Data

Jan. 25, 1999 (EP) .................... 99400175

(51) Int. Cl.
H04N 7/173 (2006.01)

(52) U.S. Cl. .............. 725/86; 725/118; 725/131; 725/148; 725/151; 709/222; 726/29

(58) Field of Classification Search ............ 725/98, 725/110, 126, 96; 709/230
See application file for complete search history.

(56) References Cited

U.S. PATENT DOCUMENTS

| 5,835,725 | A  | * | 11/1998 | Chiang et al. ............. 709/228 |
| 5,987,518 | A  | * | 11/1999 | Gotwald ................... 709/230 |
| 6,216,166 | B1 | * | 4/2001  | Zheng et al. .............. 709/238 |
| 6,219,355 | B1 | * | 4/2001  | Brodigan .................. 370/486 |
| 6,272,127 | B1 | * | 8/2001  | Golden et al. ............. 370/352 |
| 6,314,111 | B1 | * | 11/2001 | Nandikonda et al. ....... 370/473 |
| 6,351,467 | B1 | * | 2/2002  | Dillon ..................... 370/432 |
| 6,459,427 | B1 | * | 10/2002 | Mao et al. ................ 725/109 |
| 6,507,953 | B1 | * | 1/2003  | Horlander et al. ......... 725/105 |
| 6,557,031 | B1 | * | 4/2003  | Mimura et al. ............ 709/218 |
| 6,560,221 | B1 | * | 5/2003  | Hara et al. ............... 370/352 |
| 6,611,537 | B1 | * | 8/2003  | Edens et al. .............. 370/503 |

FOREIGN PATENT DOCUMENTS

| EP | 0 730 382 A2 | 9/1996 |
| EP | 0 844 766 A2 | 5/1998 |

(Continued)

OTHER PUBLICATIONS

PCT/FI96/00640; Hakulinen; Publication Date: Jun. 5, 1997.*

(Continued)

Primary Examiner—Chris Kelley
Assistant Examiner—Justin Shepard
(74) Attorney, Agent, or Firm—Osha Liang LLP (57) ABSTRACT A method of transmission of digital information in a digital broadcast system including a central transmission station and one or more decoders, the central station transmitting at least one transport stream comprising a stream of packets encapsulating data tables or sections within their payloads, one or more encapsulated sections including a medium access control (MAC) address used to control the reception of that section by one or more decoders wherein the MAC address is dynamically assigned by the central transmission station and communicated to the or each decoder in an address assignment message using a fixed IP address.

31 Claims, 6 Drawing Sheets

FOREIGN PATENT DOCUMENTS

| | | |
|---|---|---|
| EP | 0 848 553 A2 | 6/1998 |
| EP | 0 866 611 A1 | 9/1998 |
| EP | 0 877 499 A2 | 11/1998 |

OTHER PUBLICATIONS

Press Release: COCOM and Fujitsu Announce Co-operation for DVB/DAVIC MAC Processor dated Dec. 15, 1998.

European Telecommunication Standard 300 800, Jul. 1998: Digital Video Broadcasting (DVB); Interaction channel for Cable TV distribution systems (CATV).

EN 301 192 V1.1.1 (Dec. 1997): Digital Video Broadcasting (DVB); DVB specification for data broadcasting Dec. 1997.

Logic innovation brochure entitled: IP Encapsulator Data Gateway (IPEDG) 1996.

* cited by examiner

| Syntax | No. of bits | Mnemonic |
|---|---|---|
| datagram_section() { | | |
|     table_id | 8 | uimsbf |
|     section_syntax_indicator | 1 | bslbf |
|     private_indicator | 1 | bslbf |
|     reserved | 2 | bslbf |
|     section_length | 12 | uimsbf |
|     MAC_address_6 | 8 | uimsbf |
|     MAC_address_5 | 8 | uimsbf |
|     reserved | 2 | bslbf |
|     payload_scrambling_control | 2 | bslbf |
|     address_scrambling_control | 2 | bslbf |
|     LLC_SNAP_flag | 1 | bslbf |
|     current_next_indicator | 1 | bslbf |
|     section_number | 8 | uimsbf |
|     last_section_number | 8 | uimsbf |
|     MAC_address_4 | 8 | uimsbf |
|     MAC_address_3 | 8 | uimsbf |
|     MAC_address_2 | 8 | uimsbf |
|     MAC_address_1 | 8 | uimsbf |
|     if(LLC_SNAP_flag=="1"){ | | |
|         LLC_SNAP() | | |
|     } else { | | |
|         for (j=0;j<N1;j++) { | | |
|             IP_datagram_data_byte | 8 | bslbf |
|         } | | |
|     } | | |
|     if (section_number == last_section_number) { | | |
|         for (j=0;j<N2;j++) { | | |
|             stuffing_byte | 8 | bslbf |
|         } | | |
|     } | | |
|     if(section_syntax_indicator =="0") { | | |
|         checksum | 32 | uimsbf |
|     } else { | | |
|         CRC_32 | 32 | rpchof |
|     } | | |
| } | | |

FIG. 6

ADDRESS ASSIGNMENT IN DIGITAL TRANSMISSION SYSTEM

The present invention relates to a method of assignment of address information in a digital transmission system, in particular a digital broadcast system such as a digital television system.

Existing digital television systems transmit data in the form of discrete transport stream packets or transport packets, each packet being of a predetermined length and containing a header and a payload. In a given transmission system, a central transmission station transmits one or more packet streams "over the air" to a field of decoders which receive and re-assemble the packet stream. Each station may transmit a number of packet streams on a number of separate frequencies.

The packet header of packets in the stream comprises general descriptive data regarding the packet, whilst the payload comprises the data to be processed at the receiver. The packet header includes at least a packet ID or PID identifying the packet. The payload of the packet may contain audio, video or other data such as data obtained by a central transmission station from an internet connection. This sort of data within the payload of a PID packet may itself further be divided into a number of tables or sections, identified by a table ID or TID value and, in a yet further precision, a TID extension value. The MPEG-2 standard is the currently favoured standard in this domain and sets out a predetermined format for such packets.

In digital broadcast systems, decoders previously used merely for conditional access or to decode the MPEG-2 coded signals now include a number of increasingly sophisticated functions. In particular, a number of systems have been proposed using a decoder, operating independently or in combination with a PC to provide links to the internet to enable a user to browse the internet. Often, a hybrid broadcast/telecommunication configuration is used whereby web pages are requested by a decoder via a telecom link to a central station and obtained and transmitted by the central station via the broadcast link to the decoder.

Internet data is itself organised according to the TCP/IP protocol which sets out, inter alia, a predetermined format for such data (so-called "datagrams"). To enable the free circulation of datagram information between networks, a datagram packet includes addresses at a number of levels. In particular, each datagram is normally addressed at the network layer with an IP address and at the datalink layer with a medium access control or MAC address.

Sending a message to a given network user usually involves addressing the user with both its MAC and IP addresses, although methods exist within subnets to determine MAC addresses using just IP addresses. Unlike the IP address which is assigned by a network manager, the MAC address is normally fixed in a device at the moment of its manufacture.

The incorporation of internet format datagrams in broadcast transport packets has required the development of a number of standards to regulate the encapsulation process. In the MPEG related standard ISO 13818-6 a format for such data using DSM-CC carousels within the stream is defined.

Work done by other groups, notably the Digital Video Broadcasting or DVB group, complements and elaborates on this standard. In particular, the DVB proposed ETSI standard EN 301 192 sets out the standard format for a table or section within an MPEG-2 transport packet adapted to carry IP datagrams. The standard indicates how such datagrams, addressed to a user by MAC and IP addresses are incorporated in a table or section encapsulated within a transport packet in the transport stream, and indicate what other information should normally be present in such sections.

In a first embodiment, the present invention is concerned with an optimised method for transmission of addressed messages encapsulated within a broadcast transport stream, in particular but not exclusively, IP datagrams incorporated within a section of an MPEG-2 transport stream.

The present invention provides a method of transmission of digital information in a digital broadcast system comprising a central transmission station and at least one decoder, the central station transmitting at least one transport stream comprising a stream of packets encapsulating data sections within their payloads, at least one encapsulated section including an access control address used to control the reception thereof by at least one decoder, the access control address being defined by the central transmission station and communicated to said at least one decoder in an address assignment message.

According to a first embodiment of the invention, there is provided a method of transmission of digital information in a digital broadcast system comprising a central transmission station and one or more decoders, the central station transmitting at least one transport stream comprising a stream of packets encapsulating data tables or sections within their payloads, one or more encapsulated sections including an access control address used to control the reception of that section by one or more decoders and characterised in that the access control address is defined by the central transmission station and communicated to the or each decoder in an address assignment message.

In conventional broadcast and network systems, a fixed medium access control address is normally used. This may correspond, for example, to the MAC address fixed in the modem card of the decoder at the moment of its manufacture. In such a system the central transmission station has no control over this value, which is communicated from a decoder to the central station, or to the nearest router in charge of routing the datagram.

In contrast, in the present invention, the central transmission station is responsible for the assignment of access control values to decoders within the system, opening the way to a dynamic assignment of such values and a fuller control at the level of the central transmission station of the number and format of the addresses to be handled by the system.

Whilst the present application refers to a central transmission station, it is to be understood that the assignment of address messages may in practice be handled by a physically separate routing device reporting to the transmitting station responsible for the broadcasting of information.

Preferably, the section corresponds to a datagram section used to contain internet protocol data, the data contained within the section also including an internet protocol address. However, as will be understood, the invention may equally be applied to other types of data contained within a table or section encapsulated within a packet transport stream and addressed to one or more decoders by an access control address.

As discussed above, in hybrid telecom/broadcast systems, a decoder will normally send a request for example for internet protocol data via the telecom link and receive the downloaded information via a broadcast link, within a data section identified with an access control address and encapsulated within the transport packet stream.

However, in one embodiment, some or all of the section data destined for one or more decoders and identified by an access control address may also be communicated from the central transmission station to the or each decoder via a telecommunications network. In particular, internet data may be transmitted via the telecom network using the access control address.

Preferably, a decoder may also send a request for an access control address to the central station via such a telecommunications network. In a similar manner, the address assignment message may also be communicated back from the central transmission station to that decoder using a telecommunications network link.

The use of a telecom link to request and obtain the assigned access control address enables a decoder to rapidly obtain an access control address to be used thereafter in communicating information obtained during a session of browsing the internet.

Preferably, the address request message sent by a decoder includes an internet protocol number identifying that decoder to the central transmission station. This IP number is normally assigned by the network manager or broadcast operator and may be used as to identify a decoder in addition to or as an alternative to an ID value assigned by an operator to its subscribers.

Advantageously, the address request message sent by the decoder also includes an indication of whether the decoder wishes to receive messages in a unicast or multicast mode. In response to this demand, the central transmitting station will then transmit a unique or shared control address in the address assignment message.

A unique address may be required, for example, in the case of an internet browsing session, where a user will be supplied by the central station with specific web pages in response to specific requests from a user, whilst a multicast address may be used to address information destined for a group of users.

In the case of a unicast address, this may be a dynamic address assigned at the beginning of a session, in response to the address request received from the decoder. Alternatively, an address may be assigned at the first connection of a user to the central transmitting station and used thereafter in all subsequent communications.

In addition to unicast and multicast request information, the address request message may also include an indication of whether the decoder will remain connected to receive data via a telecommunications network after the communication of the address request message.

As described above, the central transmission station may broadcast data on a number of transport packet streams and on number of services within each transport packet stream. Preferably, the address assignment message further includes information to enable the or each decoder to select a packet transport stream containing the data associated with the access control address amongst a plurality of transport packet streams.

Additionally, the address assignment message may further include information to enable the or each decoder to select the service containing the data associated with the access control address from a plurality of services within a transport packet stream.

Since a service may also be associated with different types of data or data streams (audio, visual, IP data etc.), the address assignment message may also include information regarding the data streams carried by that service and identifying the data stream containing the packetised data associated with the assigned access control address.

The central transmission station may also dynamically control the transport packet stream and/or service on which the addressed data is to be carried, so as to optimise the broadcast of information amongst and within one or more transport streams.

In the case, for example, of a digital broadcast system associated with a conditional access system, some or all of the section data transmitted by the central control station may be encrypted.

The above embodiments of the invention have been described in relation to a digital broadcast system, such as a digital television system. However, the dynamic assignment of MAC addresses may also be applied to other systems such as, for example, systems using exclusively a fixed telecommunications network.

Viewed from another aspect, the present invention comprises a method of communication of datagram packets in a digital communication network comprising at least one central control station and a plurality of remote terminals, in which the datagram packets include at least a medium access control address associated with one communication layer of the network and an internet protocol address associated with a second communication layer of the network, and in which medium access control addresses are dynamically assigned by the central control station in response to a request from a remote terminal.

The present invention also provides apparatus for transmitting a transport stream comprising a stream of packets encapsulating data sections within their payloads to a decoder, at least one encapsulated section including an access control address used to control reception thereof by a decoder, said apparatus comprising means, for example, a server, for defining the access control address, and means, for example, a transmitter, for communicating to said decoder the access control address in an address assignment message.

Features described above relating to method aspects of the present invention can also be applied to apparatus aspects, and vice versa.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", a decoder functioning in combination with a physically separate receiver, or a decoder including additional functions, such as a web browser, or a decoder integrated with other devices such as a video recorder or a television.

The term "decoder" or "receiver/decoder" in this context also includes decoder/PC configurations, in which some or all of the functions relating to the present invention may be handled by the PC, such as sending an address request message via the modem of the PC etc.

As used herein, the term "digital broadcast system" includes any digital system broadcasting information from a central station to a plurality of users in a known broadcasting format and including for example any satellite, terrestrial, cable or other digital television system.

The term MPEG refers to the data transmission standards developed by the International Standards Organisation working group "Motion Pictures Expert Group" and in particular but not exclusively the MPEG-2 standard developed for digital television applications and set out in the documents ISO 13818-1, ISO 13818-2, ISO 13818-3 and ISO 13818-4 together with the MPEG related DSM-CC standard ISO 13818-6. In the context of the present patent application, the term includes all variants, modifications or developments of MPEG formats applicable to the field of digital data transmission.

In relation to DVB or ETSI standards, these include all standards proposed by DVB and/or accepted by ETSI related to the field of digital television, and all variants, modifications or developments thereof. In particular, in the present application, reference is made to the ETSI standard EN 301 192.

There will now be described, by way of example only, a preferred embodiment of the invention, with reference to the following figures, in which.

DIGITAL TELEVISION SYSTEM

Before describing in detail an embodiment of the invention, there will now be described an overview of a known system by way of background.

Figure 1:
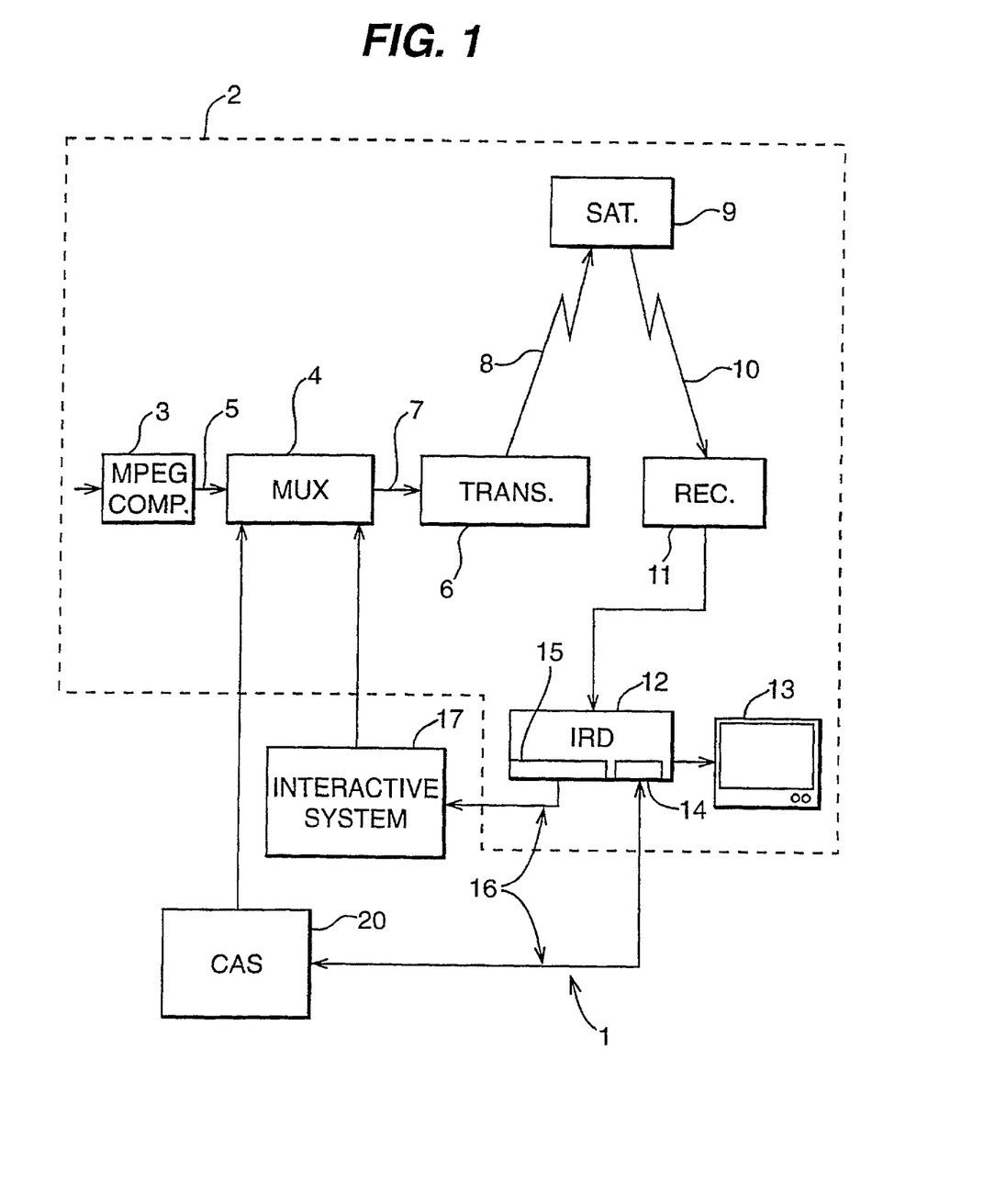
FIG. 1 shows the overall architecture of a known digital TV system as may be adapted in accordance with the present invention.

A digital television broadcast and reception system 1 is shown in FIG. 1, comprising a mostly conventional digital television system 2 which uses the MPEG-2 compression system to transmit compressed digital signals. In more detail, MPEG-2 compressor 3 in a broadcast centre receives a digital signal stream (for example a stream of audio, video or general data signals). The compressor 3 is connected to a multiplexer and scrambler 4 by linkage 5. The multiplexer 4 receives a plurality of further input signals, assembles one or more transport streams and transmits compressed digital signals to a transmitter 6 of the broadcast centre via linkage 7.

The transmitter 6 transmits electromagnetic signals via uplink 8 towards a satellite transponder 9, where they are electronically processed and broadcast via a notional downlink 10 to earth receiver 11, conventionally in the form of a dish owned or rented by the end user. The signals received by receiver 11 are transmitted to an integrated receiver/decoder 12 owned or rented by the end user and connected to the end user's television set 13. The receiver/decoder 12 decodes the compressed MPEG-2 signal into a television signal for the television set 13.

As will be described below, the decoder 12 may also be connected with a PC, in particular where the user is using the decoder to provide internet access. As will be further understood, whilst the invention will be described primarily in relation to a satellite broadcast system, it may equally be used in relation to a cable TV or terrestrial television based system.

A conditional access system 20 is connected to the multiplexer 4 and the receiver/decoder 12, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 12. Using the decoder 12 and smartcard, the end user may purchase events in either a subscription mode or a pay-per-view mode.

An interactive system 17, also connected to the multiplexer 4 and the receiver/decoder 12 and again located partly in the broadcast centre and partly in the decoder, may be provided to enable the end user to interact with various applications via a modemmed back channel 16. In particular, in the case where the decoder is used to provide internet access, information between the decoder and broadcast centre may be passed via the modem channel as well being broadcast via the satellite link. This type of hybrid broadcast and telecom system is known in the art.

Figure 2:
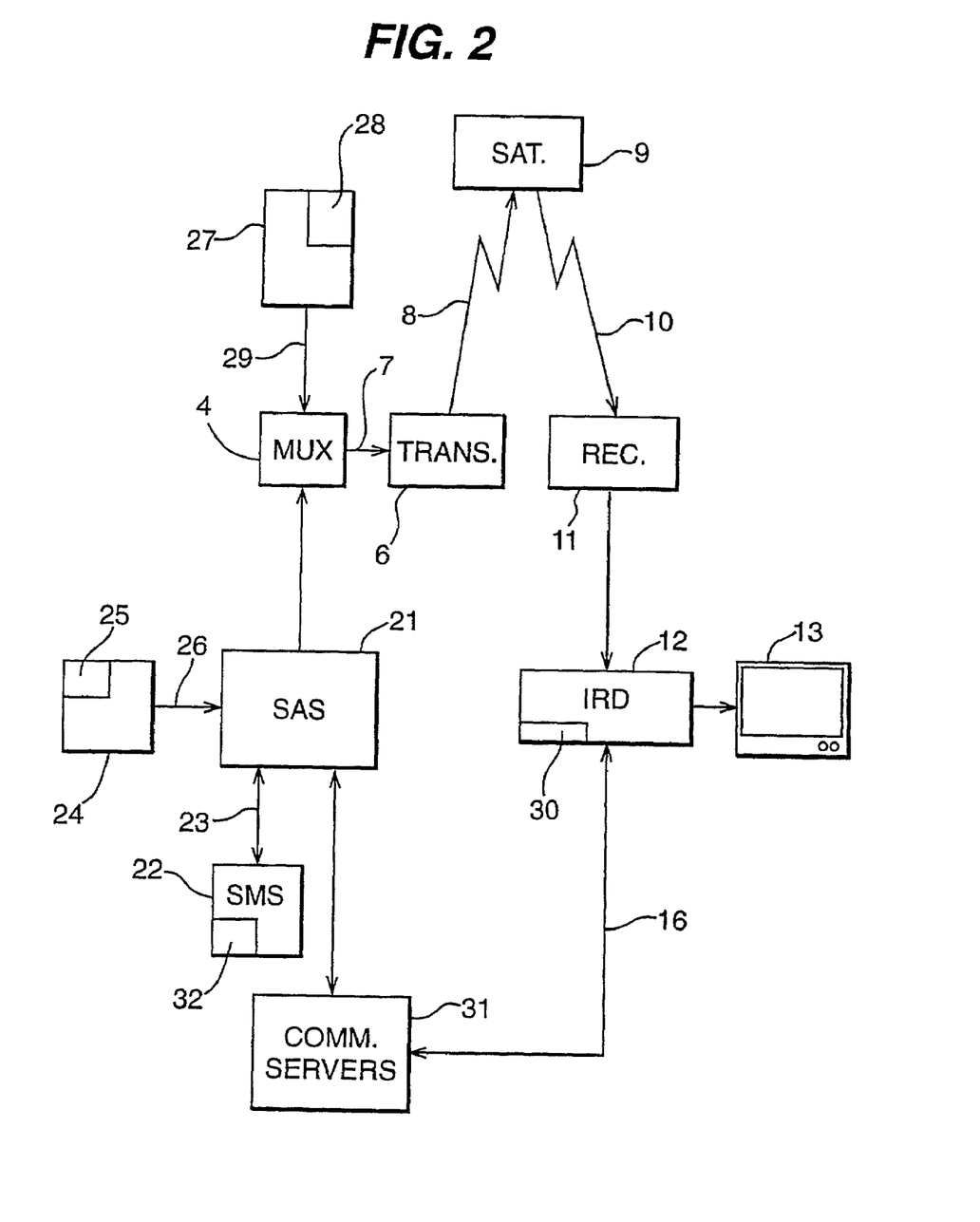
FIG. 2 shows the architecture of the conditional access system of FIG. 1.

The conditional access system 20 will now be described in more detail. With reference to FIG. 2, in overview the conditional access system 20 includes a Subscriber Authorization System (SAS) 21. The SAS 21 is connected to one or more Subscriber Management Systems (SMS) 22, one SMS for each broadcast supplier, by a respective TCP-IP linkage 23 (although other types of linkage could alternatively be used). Alternatively, one SMS could be shared between two broadcast suppliers, or one supplier could use two SMSs, and so on.

First encrypting units in the form of ciphering units 24 utilising "mother" smartcards 25 are connected to the SAS by linkage 26. Second encrypting units again in the form of ciphering units 27 utilising mother smartcards 28 are connected to the multiplexer 4 by linkage 29. The receiver/decoder 12 receives a "daughter" smartcard 30 by the decoder to decrypt messages encrypted by the "mother" smartcard. It is connected directly to the SAS 21 by Communications Servers 31 via the modemmed back channel 16. The SAS sends, amongst other things, subscription rights to the daughter smartcard on request.

The first and second ciphering units 24 and 27 comprise a rack, an electronic VME card with software stored on an EEPROM, up to 20 electronic cards and one smartcard 25 and 28 respectively, for each electronic card, one card 28 for encrypting the ECMs and one card 25 for encrypting the EMMs.

Multiplexer and Scrambler

With reference to FIGS. 1 and 2, in the broadcast centre, the digital audio or video signal is first compressed (or bit rate reduced), using the MPEG-2 compressor 3 (shown in FIG. 1). This compressed signal is then transmitted to the multiplexer and scrambled 4 via the linkage 5 (shown in FIG. 1) in order to be multiplexed with other data, such as other compressed data.

The scrambler generates a control word used in the scrambling process and included in the MPEG-2 stream in the multiplexer. The control word is generated internally and enables the end user's integrated receiver/decoder 12 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels.

Entitlement Control Messages

Both the control word and the access criteria are used to build an Entitlement Control Message (ECM). This is a message sent in relation with a scrambled program; the message contains a control word (which allows for the descrambling of the program) and the access criteria of the broadcast program. The access criteria and control word are transmitted to the second encrypting unit 27 via the linkage 29. In this unit, an ECM is generated, encrypted and transmitted on to the multiplexer and scrambler 4. During a broadcast transmission, the control word typically changes every few seconds, and so ECMs are also periodically transmitted to enable the changing control word to be descrambled. For redundancy purposes, each ECM typically includes two control words; the present control word and the next control word.

Entitlement Management Messages (EMMs)

The EMM is a message dedicated to an individual end user (subscriber), or a group of end users. Each group may contain a given number of end users. This organisation as a group aims at optimising the bandwidth; that is, access to one group can permit the reaching of a great number of end users. Various specific types of EMM can be used. Individual EMMs are dedicated to individual subscribers, and are typically used in the provision of Pay Per View services; these contain the group identifier and the position of the subscriber in that group. Other EMM types include group or audience EMMs.

Subscriber Management System (SMS)

A Subscriber Management System (SMS) 22 includes a database 32 which manages, amongst others, all of the end user files, commercial offers, subscriptions, PPV details, and data regarding end user consumption and authorization. The SMS may be physically remote from the SAS. Each SMS 22 transmits messages to the SAS 21 via respective linkage 23 which imply modifications to or creations of Entitlement Management Messages (EMMs) to be transmitted to end users.

The SMS 22 also transmits messages to the SAS 21 which imply no modifications or creations of EMMs but imply only a change in an end user's state (relating to the authorization granted to the end user when ordering products or to the amount that the end user will be charged).

The SAS 21 sends messages (typically requesting information such as call-back information or billing information) to the SMS 22, so that it will be apparent that communication between the two is two-way.

Subscriber Authorization System (SAS)

The messages generated by the SMS 22 are passed via linkage 23 to the Subscriber Authorization System (SAS) 21, which in turn generates messages acknowledging receipt of the messages generated by the SMS 21 and passes these acknowledgements to the SMS 22.

In overview the SAS comprises a Subscription Chain area to give rights for subscription mode and to renew the rights automatically each month, a Pay Per View Chain area to give rights for PPV events, and an EMM Injector for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 21 is to manage the access rights to television programmes, available as commercial offers in subscription mode or sold as PPV events according to different modes of commercialisation (re-book mode, impulse mode). The SAS 21, according to those rights and to information received from the SMS 22, generates EMMs for the subscriber in combination with the ciphering unit 24.

Programme Transmission

The multiplexer 4 receives electrical signals comprising encrypted EMMs from the SAS 21, encrypted ECMs from the second encrypting unit 27 and compressed programmes from the compressor 3 (shown in FIG. 1). The multiplexer 4 scrambles the programmes and sends the scrambled programmes, the encrypted EMMs and the encrypted ECMs to a transmitter 6 of the broadcast centre via the linkage 7. The transmitted 6 transmits electromagnetic signals towards the satellite transponder 9 via uplink 8.

Programme Reception

The satellite transponder 9 receives and processes the electromagnetic signals transmitted by the transmitter 6 and transmits the signals on to the earth receiver 11, conventionally in the form of a dish owned or rented by the end user, via downlink 10. The signals received by receiver 11 are transmitted to the integrated receiver/decoder 12 owned or rented by the end user and connected to the end user's television set 13. The receiver/decoder 12 demultiplexes the signals to obtain scrambled programmes with encrypted EMMs and encrypted ECMs.

If the programme is scrambled, the receiver/decoder 12 extracts the corresponding ECM from the MPEG-2 stream and passes the ECM to the "daughter" smartcard 30 of the end user. This slots into a housing in the receiver/decoder 12. The daughter smartcard 30 controls whether the end user has the right to decrypt the ECM and to access the programme. If not, a negative status is passed to the receiver/decoder 12 to indicate that the programme cannot be descrambled. If the end user does have the rights, the ECM is decrypted and the control word extracted. The decoder 12 can then descramble the programme using this control word. The MPEG-2 stream is decompressed and translated into a video signal for onward transmission to television set 13.

As will be appreciated, the same conditional access principles used in the encryption and decryption of audiovisual data can be used to encrypt other data, such as file data destined for a PC connected to the decoder, data gathered via an internet connection and broadcast via the satellite link etc.

Organisation of Data Tables within the Transport Stream

Figure 3:
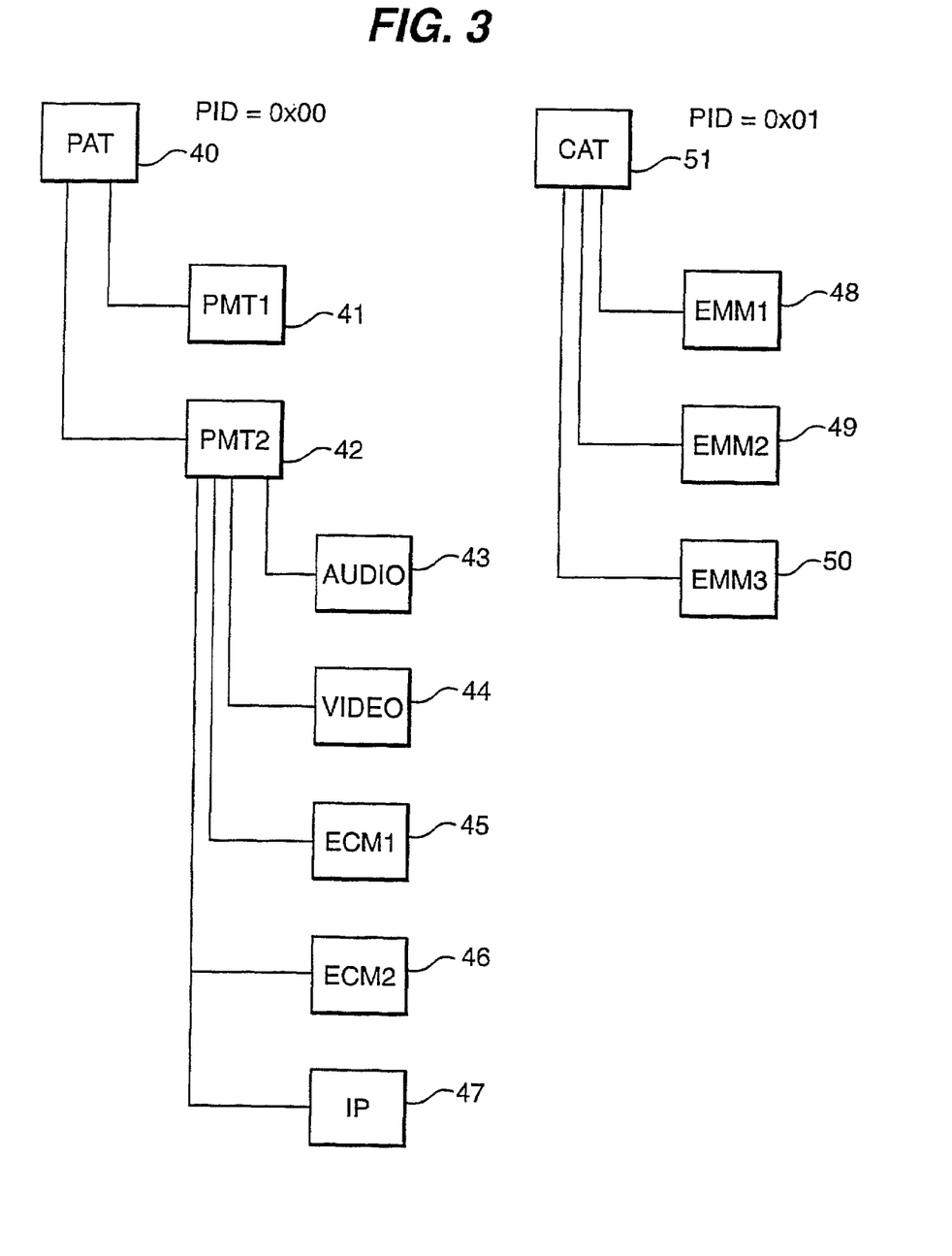
FIG. 3 shows the hierarchy of MPEG-2 packets in a transport packet stream.

As shown in FIG. 3, a broadcast MPEG-2 data transport stream contains a number of packets of standard format, including a programme association table 40 ("PAT"). The PID in the header of the packet is fixed by the MPEG-2 standard for this packet at a value of 0x00. The programme access table 40 provides the entry point for access to programme data and contains a table referring to the PID values of the programme map tables ("PMT") 41, 42 associated with a given service or channel within the stream. Each programme map table 41, 42 contains in turn a reference to the PID values of the packet streams of the audio tables 43 and video tables 44 associated with that service.

As shown, the programme map table 42 also contains references to the PID values of other packets 45, 46, 47 containing additional data relating to the service in question such as ECM data 45, 46. In particular, internet protocol or IP data 47 may be carried by a service in packets accessed via the PAT table 40. In a MPEG-2 standard transport stream, such data is organised in DSM-CC data and object carousels within specific sections of the transport stream. For further detail regarding the DSM-CC format, the reader is referred to the MPEG related standard ISO 13818-6.

In addition to the programme access table PAT 40, the MPEG transport stream further comprises a conditional access table 51 ("CAT"), the PID value of which is fixed at 0x01. Any packet headers containing this PID value are thus automatically identified as containing access control information. The CAT table 51 refers to the PID values of MPEG packets 48, 49, 50 referring to EMM data associated with one or more conditional access systems. As with the PMT packets, the PID values of the EMM packets referred to in the CAT table 51 are not fixed and may be determined at the choice of the system operator.

The MPEG-2 standard specifies very few fixed PID values outside of the PAT table value and the CAT table value referred to above. The majority of PID values within a certain range may therefore be determined by an operator.

Format of Transport Packets and Private Section Data

As is known, MPEG transport packets are of a fixed length of 188 bytes including a header. In a standard packet, the three bytes of the header following the synchronisation data comprise:

TABLE I

| | |
|---|---|
| Transport error indicator | 1 bit |
| Payload unit indicator | 1 bit |
| Transport priority | 1 bit |
| PID | 13 bits |
| Transport scrambling control | 2 bits |
| Adaptation field control | 2 bits |
| Continuity counter | 4 bits |

The characteristics of these fields are largely determined by the MPEG standard.

The above describes the format of the header of a transport packet. In conformity with the MPEG-2 standard, information contained with a packet payload is subject to a further level of structure according to the type of data being transported. In the case of audio, visual, teletext, subtitle or other such rapidly evolving and synchronised data, the information is assembled in the form of what is known as a packetised elementary stream or PES. This data stream, which is formed by assembling the payloads of the transmitted packets, itself comprises a sequence of packets, each packet comprising a packet header and payload. Unlike the transmitted packets in the transport stream, the length of PES packets is variable.

In the case of other types of data, such as IP or ECM and EMM data, a different format from PES packeting is proscribed. In particular, data contained in the transport packet payload is divided into a series of sections or tables, the table or section header including a table ID or TID identifying the table in question.

Depending on the size of the data, a table may be contained entirely within a packet payload or may be extended in a series of sections over a number of transport packets. In such a case, each section will include a TID extension value. In the MPEG-2 context, the term "table" is often used to refer to a single table of data or the amalgamation of a number of sections of the same TID value to form a table, whilst "section" usually refers to one of a plurality of tables with the same TID value.

The actual TID values used to refer to information carried in these tables or sections are not fixed by the MPEG-2 standard and may be normally defined at the discretion of the operator of a service or bouquet of services. However, as will be described below, in the case of a DSM-CC section, the TID value is fixed by the DVB proposed ETSI standard EN 301 192 at a predetermined value.

As with transport packet data and PES packet data, the data structure or syntax of a table or section is also defined by the MPEG-2 standard. Two possible syntax forms for private table or section data are proposed; a long form or a short form. For further information regarding table syntax, the reader is referred to the MPEG-2 standard.

Encapsulation of Internet Protocol Data in the Transport Stream

In order to better understand the use of different addresses in the communication of internet protocol data, it may be helpful to consider the situation in relation to conventional fixed telecom networks, for example, as found in a standard PC/server network environment. In such a network a number of layers are usually defined as per the OSI networking model, the bottom three usually comprising a physical layer, a datalink layer and a network layer.

The physical layer represents the lowest layer and corresponds to the physical modem/cable connections used to transport information.

The datalink layer corresponds to the data format imposed by the hardware elements within a network, for example the well-known Ethernet and Token Ring formats. Messages are communicated at this layer using Media Access Control or MAC addresses. Conventionally, MAC addresses are fixed value 6 byte addresses. These addresses are built-in at manufacture of the devices and are stored in permanent form, for example, in the Ethernet or Token Ring card of the hardware device present in the network.

The network layer corresponds to the layer above the datalink layer. Messages operating at this layer are encapsulated within datalink layer messages of the kind described above. In the case of internet information, this layer is associated with the Internet Protocol or IP format, the destination of messages at this level being identified by IP addresses. These IP addresses are 4 bytes long and, in contrast with MAC address values, are assigned by a network manager to a given user.

For the example of an IP message sent via an Ethernet wire the following message structure will be observed:

Ethernet Header
   (with 6 byte MAC address)
IP header
   (with 4 byte IP address)
Actual data
IP Trailer
Ethernet Trailer This type of structure is also preserved in the case of IP messages or datagrams encapsulated within a table or section of an MPEG broadcast transport stream. This in part reflects the hybrid nature of most broadcast systems, where a decoder may send and receive messages either via a telecom connection or over the air. In such circumstances it is obviously desirable to have a coherent addressing policy for IP datagrams sent via either branch of the system.

Figure 4:
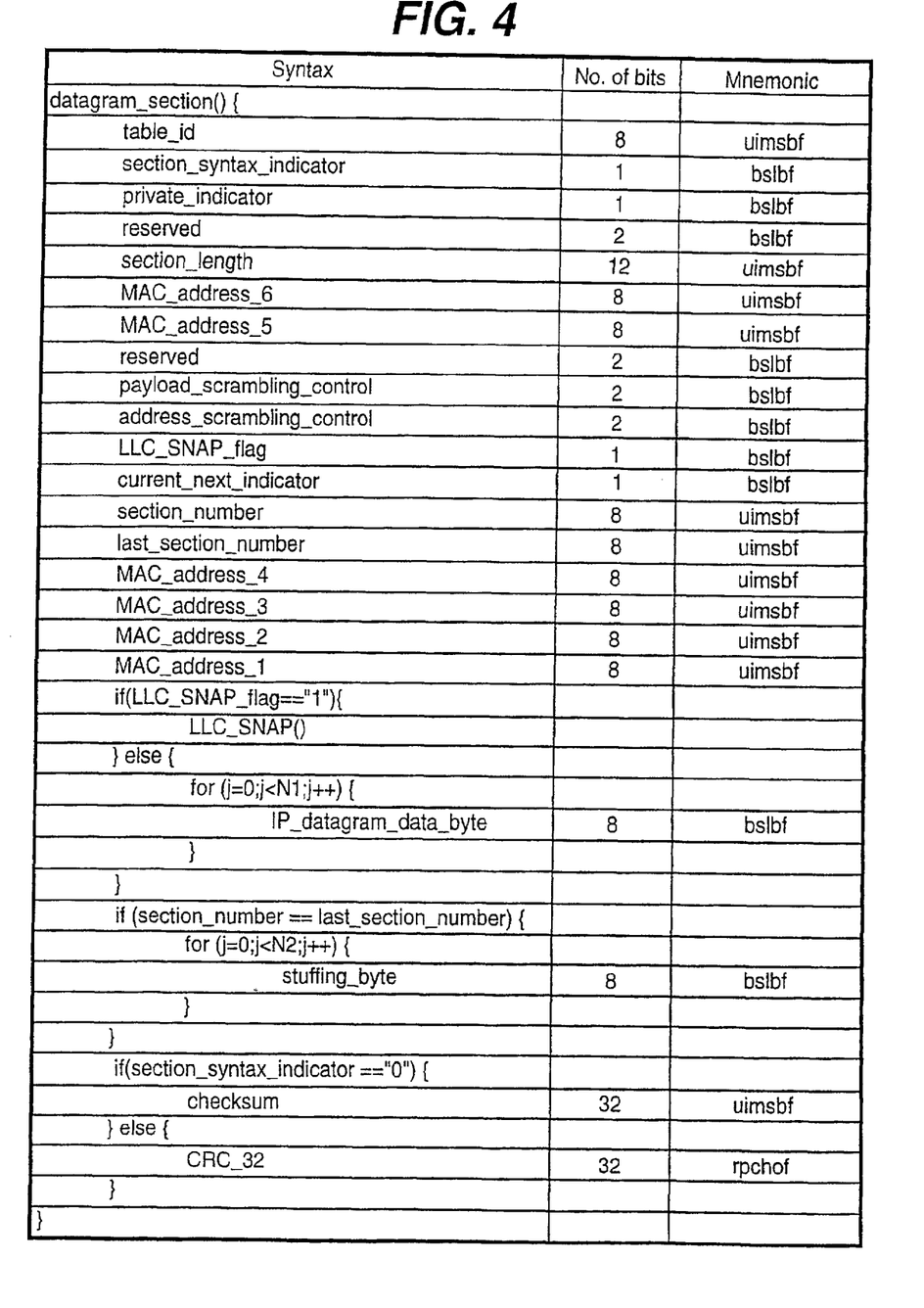
FIG. 4 shows the syntax of a DSM-CC datagram section used to encapsulate IP data.

The DVB proposed ETSI standard EN 301 192 sets out a standard format for MPEG sections carrying IP datagram information. FIG. 4 shows the syntax of such a section.

Although the PID value of such a section is dependent on that assigned by the PMT table, the TID value for IP datagrams is in fact fixed by the standard at the value 0x3E, corresponding to a DSM-CC section with private data.

Figure 5:
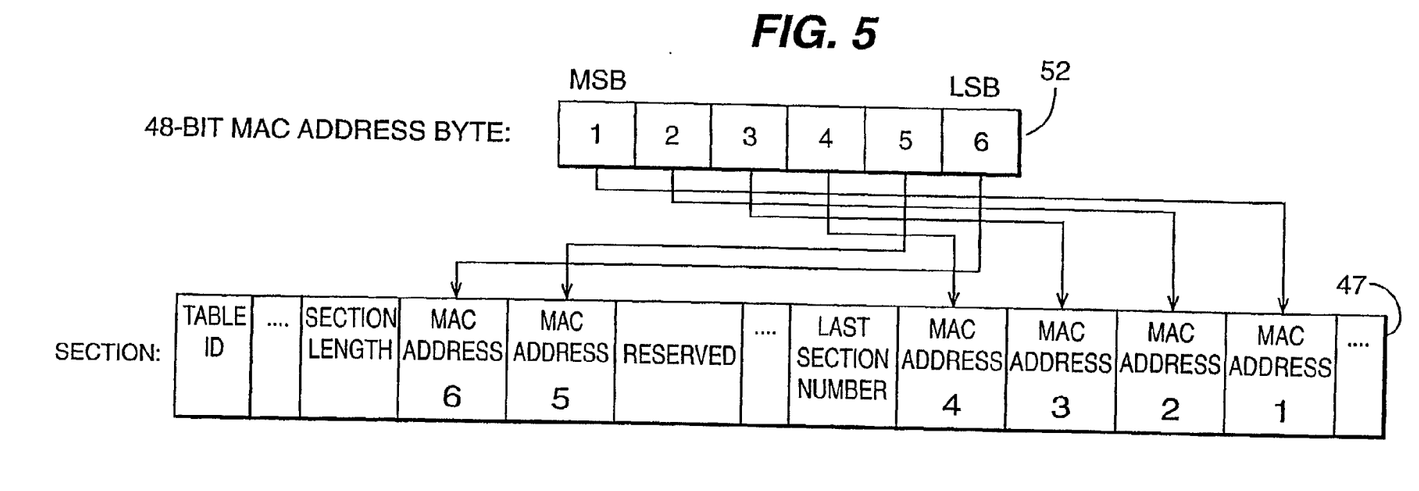
FIG. 5 shows the mapping of a MAC address with the datagram section shown in FIG. 4.

As will be seen from FIG. 4, the 6 bytes of the MAC address value of the particular device to be addressed by the section are spread out in the section 47. FIG. 5 shows the reconstitution of the MAC 52 address within the section 47.

As further shown in FIG. 4, the standard foresees the possibility of the IP data carried in the section being scrambled, as indicated by the payload_scrambling_control field. The MAC address itself may also be as indicated by the address_scrambling_control field. Depending on the value of these fields, a receiver/decoder will carry out (if necessary) decryption of the address or payload data in a similar manner as decryption of audiovisual programmes is carried out using the conditional access system. See the description of FIGS. 1 and 2.

As is conventional, the section also indicates its extension number given by the section_number_field as well as the total number of sections making up the complete table, as given by the last_section_number field.

System Architecture and Management of Addresses

Figure 6:
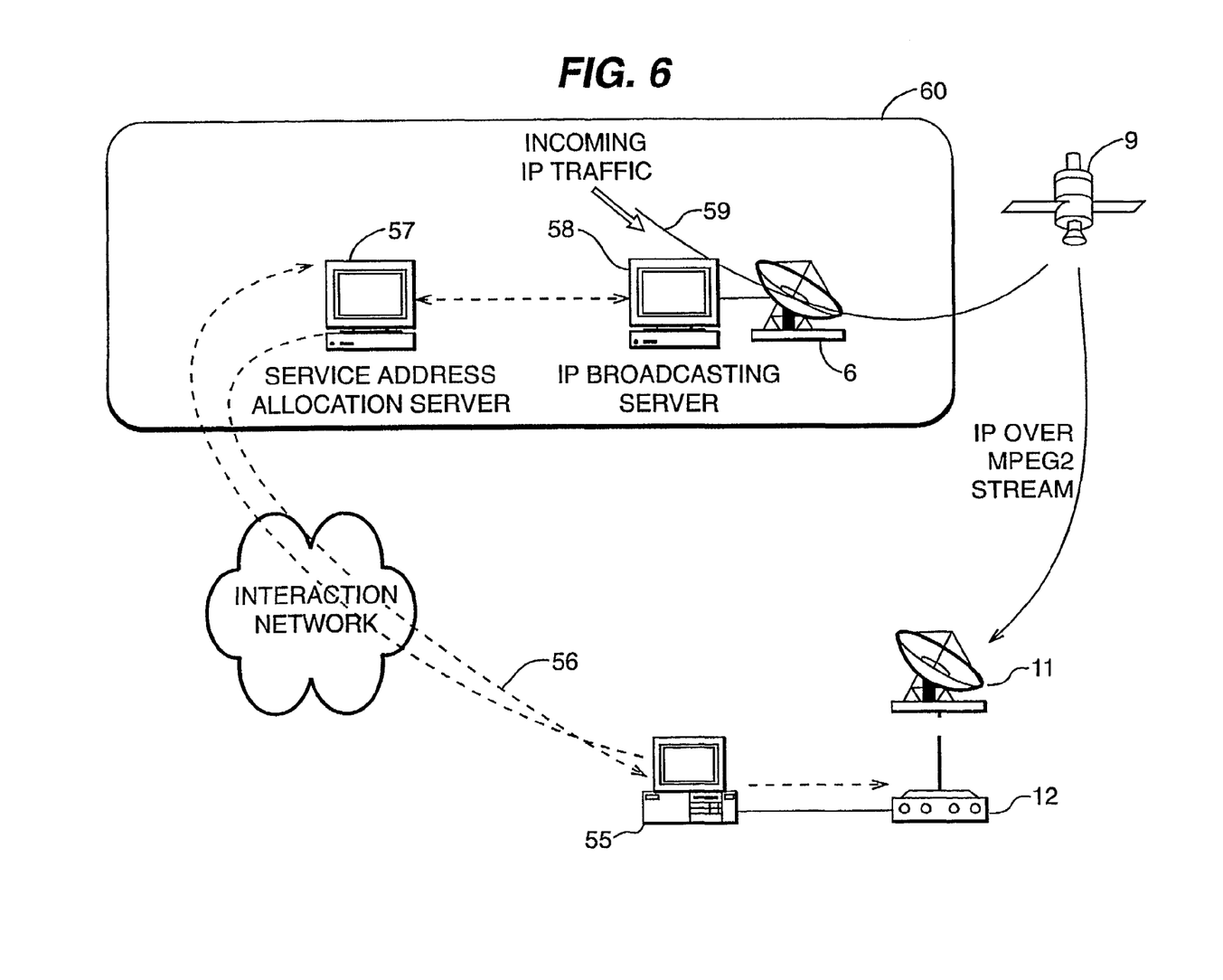
FIG. 6 shows the architecture of a hybrid broadcast and telecom network system according to this embodiment of the invention.

Referring to FIG. 6, there will now be described the system architecture of a hybrid broadcast and telecom communication system adapted to handle variable MAC addresses.

As before, the broadcast centre includes a transmitter 6 sending a digital television signal via a satellite 9 to a receiver 11 and decoder 12. In the present example, the home system further comprises a PC device 55 connected to the decoder 12. The PC device communicates via a modem channel 56 to a central transmission station 60 including a service address allocation server 57 and an IP broadcast server 58 present at the broadcast centre.

The respective functions of the servers 57, 58 in handling variable addresses data and inserting IP data in the transport stream will be described in more detail below. Whilst the division of these functions between two servers is a convenient way of handling such data, other configurations are of course possible, e.g. using a single server for all functions.

The configuration of PC 55 and decoder 12 is particularly adapted for a user who wishes to browse the web since the greater processing power of the PC enables it to better handle the volumes of IP data that may be downloaded via the satellite link or via a direct modem connection. However, the use of a PC is not obligatory, particularly if a decoder is provided with its own modem and sufficient processing power to operate independently.

As mentioned above, the system shown in FIG. 6 uses a hybrid broadcast/telecom architecture. In practice, data flows in this system in a largely clockwise direction, requests for internet data from the PC/decoder combination 12, 55 being forwarded via the telecom link 56 to the broadcast servers 57, 58 which process the request and download the internet data via the satellite broadcast link 9. The system may also be configured to download data to the PC/decoder combination via the telecom network 56, for example in the case of a bottleneck or malfunction in the transmission of data via the satellite link 9. As shown by the arrow 59, internet or IP data is gathered by the IP broadcast server 59 for example from any number of external servers and prepared for insertion into the broadcast transport stream.

In conventional systems, the manufacturer defined MAC addresses in the modem communication card of the PC or the decoder are normally used to address datalink layer communications from the broadcast centre to the PC/decoder. These fixed addresses are communicated from the PC/decoder to the broadcast centre and thereafter inserted in the datagram sections of the transport stream intended for a particular PC or decoder.

In the present embodiment, a rather different system is proposed. Upon connection of the PC/decoder at the start of a session, the PC 55 sends a MAC address request message to the broadcast centre via the telecom network 56. This message includes at least the IP address of the user to enable the broadcast centre to identify the user in question. As will be recalled, the IP address is a normally unique network level address assigned by a network manager (or broadcast operator) upon the opening of an internet subscription.

In addition to the IP address, the request message may also include an operator ID corresponding to the general subscription ID of the user to access the services of the broadcast operator.

The request message may also further include an indication of the type of service demanded. As will be described below, three types of service are normally foreseen; (i) a connected unicast service, where the user remains in full modem connection throughout a session, (ii) a non-connected unicast service where, apart from the initial configuration message, the PC/decoder is not connected via its modem, and (iii) a multicast service. These different services will be reflected in the assignment of different MAC addresses.

In the connected unicast mode, the user is provided with a full internet service and can request internet data via the telecom link 56, this data being sent uniquely to the user in question. In the non-connected unicast mode, the user can receive data autonomously sent by the broadcast centre but still uniquely destined for that user. In a multicast mode, the user forms part of group of users (which may be all or a subset of the users in the network) who receive the same messages.

Figure 7:
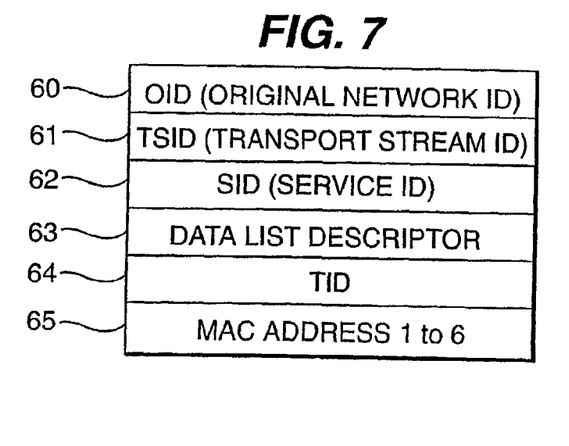
FIG. 7 shows the elements of the service address message sent from the broadcast centre to a user according to this embodiment.

Upon receipt of the request message, the service address allocation server prepares a service address message of the kind shown in FIG. 7 which is then sent back to the user. As shown, the message includes a number of data elements that will be needed by the PC/decoder to access the broadcast data, including the so-called DVB triplet of the Original Network ID 60, Transport Stream ID 61 and Service ID 62. The message also includes a data list descriptor 63 containing a list of the types of data carried by that service together with their PID value (PID video, PID audio, PID IP data, PID ECM etc.). Using the network, transport stream and service identity values and the information in the data list descriptor, the decoder will proceed via the PAT and PMT tables referred to above to arrive at the service containing the data in question.

The service address message also includes the TID value 64 of the data section addressed to the decoder/PC. However, as indicated above, in the case of IP data carried in a DSM-CC format this value is normally fixed by the ETSI standard at 0x3E.

Finally, the service address message includes an assigned MAC address value shown at 65. Unlike conventional systems, in which the PC or decoder normally send their manufacturer fixed MAC value to the broadcast centre, the MAC address 65 is generated by the service address allocation server 57, which maintains a database of the assigned MAC values together with the cross-linked IP address and operator ID values.

The MAC address assigned will depend in part on the type of service requested; unicast connected, unicast non-connected or multicast. A unicast connected address is assigned for a given session and is variable from session to session. A unicast non-connected address may be variable, but may also be a fixed value assigned at the moment of subscription, or upon the first connection of the user and thereafter maintained as long as that user maintains his subscription. Finally, a multicast address corresponds to an address assigned by the server to a particular IP service and which may be received by any decoder within a group that has obtained access to the MAC address. This may even include decoders or PC/decoder combinations not possessing a modem back channel or telecom connection to the broadcast centre.

The MAC address assigned may also depend on other service factors, such as bandwidth reservation, presence or absence of conditional access etc.

The assignment of MAC addresses in this way enables the central broadcast servers 57, 58 to dynamically repartition the IP data sent to a particular decoder or a group of decoders and to minimise the number of MAC addresses to be handled and addressed at any time. This avoids the problem of having a large number of dormant MAC addresses reserved in the transport stream as well as enabling the central servers to manage a smaller number of changing users.

The use of a group MAC address in a multicast mode enables certain IP data of interest to all decoders in a set (for example, the home page of the broadcast operator) to be accessed via a single point of entry and avoids the repetition of information in the use of a plurality of user specific tables.

Furthermore, the system permits the dynamic assignment of data across a number of MPEG services within a transport stream. As shown in FIG. 7, the service address message also includes a variable DVB triplet address, enabling the central broadcast servers to assign IP data to unused services within the transport stream as they become available. The choice of MPEG service can take into account, for example, the user's rights to access some or all of the service within the transport stream as determined by the appropriate conditional access system. A secure transmission of data can therefore also be assured.

This dynamic repartition of services and data as determined by the broadcasting server 58 and service address allocation server 57 enables optimal use of the available bandwidth. Whilst the system has been described in relation to a satellite broadcast system, the same principles apply to cable television or digital television systems or indeed any system carrying data in a broadcast format packet stream, such as an MPEG transport stream.

In a yet broader context, the invention may even be applied to any system including address information at a datalink layer and a network layer which conventionally uses fixed media access control addresses in the datalink layer including networks comprising solely telecom connections.

The invention claimed is:

1. A method of transmission of digital information in a digital broadcast system comprising a central transmission station and at least one decoder, the central station transmitting at least one transport stream comprising a stream of packets encapsulating data sections within their payloads, wherein at least one encapsulated section includes at least one medium access control (MAC) address used to control the reception thereof by the at least one decoder, wherein the at least one MAC address is dynamically assigned by the central transmission station and communicated to said at least one decoder using a fixed internet protocol (IP) address in an address assignment message, wherein the at least one MAC address is based on a type of service requested by the decoder, wherein the type of service requested is one selected from the group consisting of a multicast service, a connected unicast service and a non-connected unicast service.

2. The method as claimed in claim 1, wherein said at least one encapsulated section corresponds to at least one datagram section used to contain internet protocol data, the data contained within a datagram section also including the fixed IP address.

3. The method as claimed in claim 1, wherein said at least one encapsulated section transmitted to said at least one decoder and identified by an access control address is communicated from the central transmission station to said at least one decoder via a telecommunications network.

4. The method as claimed in claim 1, wherein the address assignment message is sent in response to a medium access control (MAC) address request sent to the central station by the at least one decoder.

5. The method as claimed in claim 4 wherein the address assignment message is communicated back to the at least one decoder from the central transmission station via a telecommunications network.

6. The method as claimed in claim 4, wherein the MAC address request sent by the at least one decoder includes an internet protocol number identifying that decoder to the central transmission station.

7. The method as claimed in claim 4, wherein the MAC address request includes an operator identity value associated with the subscription of the owner of the decoder to the services proposed by an operator broadcasting information via the central transmitting means.

8. The method as claimed in claim 4, wherein the MAC address request includes an indication of whether the decoder wishes to receive messages in one of a unicast and a multicast mode.

9. The method as claimed in claim 8 wherein the address assignment message sent by central transmitting station contains a unique access control address in response to a unicast address request and a shared control address in response to a multicast address request.

10. The method as claimed in claim 9 wherein the unicast address is a dynamic address assigned at the beginning of a session, in response to the address request received from the decoder.

11. The method as claimed in claim 4, wherein the MAC address request includes an indication of whether the decoder will remain connected to receive data via a telecommunications network after the communication of the MAC address request.

12. The method as claimed in claim 1 wherein the address assignment message further includes information to enable said at least one decoder to select a packet transport stream containing the data associated with the at least one MAC address amongst a plurality of transport packet streams.

13. The method as claimed in claim 1 wherein the address assignment message further includes information to enable said at least one decoder to select the service containing the data associated with the at least one MAC address from a plurality of services within a transport packet stream.

14. The method as claimed in claim 13 wherein the address assignment message further includes information regarding the data streams carried by that service and identifying the data stream containing the packetized data associated with the at least one assigned MAC address.

15. The method as claimed in claim 1 wherein the central transmission station dynamically controls which transport packet stream amongst a plurality of transport packet streams is used to carry encapsulated packet data addressed for said at least one decoder.

16. The method as claimed in claim 1 wherein the central transmission station dynamically controls which service amongst a plurality of services on which encapsulated packet data addressed to said at least one decoder is broadcast.

17. The method as claimed in claim 1 wherein at least some of the data encapsulated within a packet payload is encrypted.

18. A method of communication of datagram packets in a digital communication network comprising at least one central control station and a plurality of remote terminals, in which the datagram packets include at least one medium access control (MAC) address associated with one communication layer of the network and an internet protocol (IP) address associated with a second communication layer of the network, and in which the at least one MAC address is dynamically assigned by the central control station in response to a request from a remote terminal, wherein the at least one MAC address is assigned based on a type of service requested by a remote terminal, and wherein the type of service is one selected from the group consisting of a multicast service, a connected unicast service and a non-connected unicast service.

19. Apparatus for transmitting a transport stream comprising a stream of packets encapsulating data sections within their payloads to a decoder, at least one encapsulated section including at least one medium access control (MAC) address used to control reception thereof by a decoder, said apparatus comprising means for dynamically assigning the at least one MAC address, and means for communicating to said decoder the at least one MAC address using a fixed IP address in an address assignment message, wherein the at least one MAC address is assigned based on a type of service requested by a remote terminal, and wherein the type of service is one selected from the group consisting of a multicast service, a connected unicast service and a non-connected unicast service.

20. The apparatus as claimed in claim 19, wherein said at least one encapsulated section corresponds to at least one datagram section used to contain internet protocol data, the data contained within a datagram section also including the fixed internet protocol address.

21. The apparatus as claimed in claim 19, comprising means for communicating to said decoder via a telecommunications network at least one encapsulated section identified by the at least one MAC address.

22. The apparatus as claimed in claim 19, comprising means for receiving from a decoder a medium access control (MAC) address request, said apparatus being adapted to communicate the address assignment message to the decoder in response to said MAC address request.

23. The apparatus as claimed in claim 22, adapted to communicate said address assignment message to said decoder via a telecommunications network.

24. The apparatus as claimed in claim 22, wherein the address assignment message contains a unique MAC address in response to a unicast address request and a shared MAC address in response to a multicast address request.

25. The apparatus as claimed in claim 24, wherein the unicast address is a dynamic address assigned at the beginning of a session, in response to the MAC address request received from a decoder.

26. The apparatus as claimed in claim 19, wherein the address assignment message further includes information to enable said decoder to select a packet transport stream containing the data associated with the MAC address amongst a plurality of transport packet streams.

27. The apparatus as claimed in claim 19, wherein the address assignment message further includes information to enable said decoder to select the service containing the data associated with the at least one MAC address from a plurality of services within a transport packet stream.

28. The apparatus as claimed in claim 27, wherein the address assignment message further includes information regarding the data streams carried by that service and identifying the data stream containing the packetised data associated with the at least one assigned MAC address.

29. The apparatus as claimed in claim 19, comprising means for dynamically controlling which transport packet stream amongst a plurality of transport packet streams is used to carry encapsulated packet data addressed for said decoder.

30. The apparatus as claimed in claim 19, comprising means for dynamically controlling which service amongst a plurality of services on which encapsulated packet data addressed to said decoder is broadcast.

31. The apparatus as claimed in claim 19, comprising means for encrypting data encapsulated within a packet payload.

* * * * *